July 28, 1959

F. H. BAILLY 2,896,442

MINERALOGICAL ANALYSIS

Filed July 2, 1956

INVENTOR.
FLORENT H. BAILLY

BY

Christie, Parker & Hale
ATTORNEYS

United States Patent Office 2,896,442
Patented July 28, 1959

2,896,442

MINERALOGICAL ANALYSIS

Florent H. Bailly, Pasadena, Calif.

Application July 2, 1956, Serial No. 595,161

2 Claims. (Cl. 73—15)

This invention relates to mineralogical analysis and particularly to improvements in the analytical technique commonly referred to as "differential thermal analysis."

Differential thermal analysis has found extensive use as a rapid method of identifying certain components of a mineral sample. This method of analysis is very helpful, for example, in well logging techniques for identifying the mineralogical characteristics of strata traversed by a well bore. The technique comprises plotting graphically the thermal effects of a sample as compared to a reference standard as the sample and standard are simultaneously heated through a broad temperature range. The appearance, sequence and magnitude of characteristic endothermic or exothermic induced temperature differentials between the sample and reference standard as they are heated through this range provide a basis for the identification of the responsible thermally active mineral constituents in the sample, and the amplitude and duration of such deviation provides a quantitative estimation of the concentration of such constituents. In accordance with previous practice a thermally inert standard such as aluminum oxide, i.e. alumdum, is employed which does not exhibit any thermal activity throughout the temperature range of interest. With such a standard any observed temperature differentials are as a consequence of thermally active components in the sample.

One of the difficulties presented by the previous practice of differential thermal analysis is the differences in thermal conductivity between the sample and the reference standard as either inherently existing, or resulting from the occurrence of a reaction or reactions during the run. Another difficulty which is often encountered is that a small but significant reaction may be obscured by a larger reaction occurring simultaneously with the smaller reaction. Such a condition reduces the utility of the analysis for spotting breaks, trends and maxima and minima concentrations of various minerals which are helpful in determining correlations of cuttings and cores between oil wells.

This invention overcomes both of these difficulties by providing a differential thermal analysis logging method in which a series of samples are taken from the earth strata under examination. The thermal activity of adjacent strata sample are separately compared by simultaneously heating the adjacent samples to an elevated temperature, and sensing any temperature differentials in the two adjacent strata samples whereby the deviation of one strata sample from the other may be determined.

Thus, the method of this invention measures only those reactions which are unique to each individual sample. Those reactions which are common to adjacent samples, and which therefore have no direct bearing on the determination of the strata changes, are canceled out. Uniform adjacent sections of a well, for example, will present nearly straight differential thermal analysis curves and the appearance or disappearance, or even small changes of concentration of a thermally active component will produce a sharp break in the curves. Thus, small trends and changes within a nearly uniform zone become much more apparent because the larger common reactions, which might otherwise camouflage the small but diagnostic changes, are not recorded.

These and other aspects of the invention will be more fully understood from the following detailed description taken in conjunction with the accompanying drawings in which.

The following description is for apparatus designed to accommodate the analysis of six samples simultaneously. It will be apparent that the apparatus may be modified to accommodate any number of samples at the same time.

Figure 1:
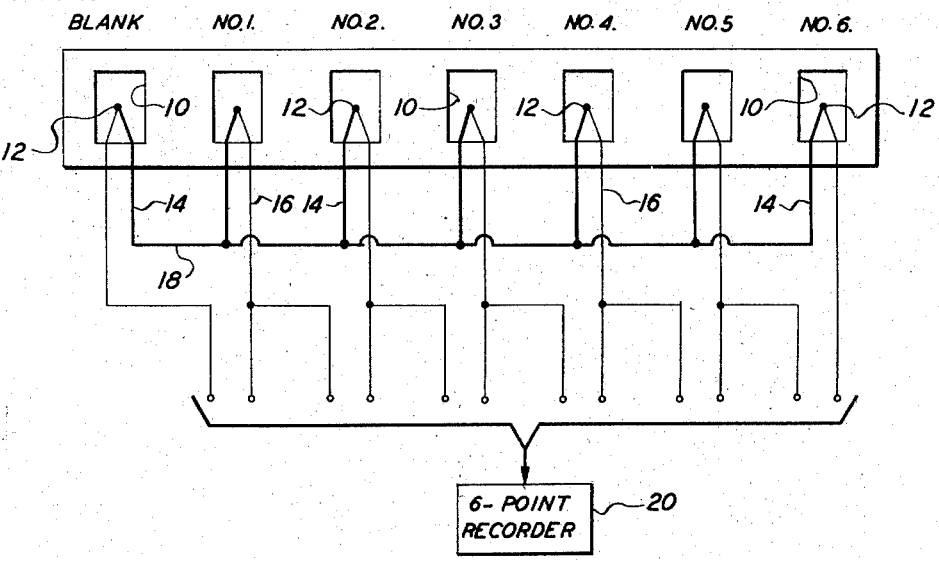
Fig. 1 is a schematic diagram of differential thermal analysis apparatus which may be used to practice the invention.

Referring to Fig. 1, a series of seven sample holders or compartments 10 are formed in the upper surface of the nickel block 11. A separate thermocouple 12 is disposed in each sample compartment and adapted to be surrounded by a sample (not shown) which fills the compartment. Each thermocouple includes a lead 14 of one metal, say chromel, joined to another lead 16 of a different metal, say alumel. The chromel lead of each thermocouple is connected to a common chromel wire 18 and the alumel lead of each thermocouple forms an output connection for its own thermocouple and an adjacent thermocouple, with the exception of the thermocouples in the sample holders at each end of the series, which are connected as shown. The sample holders are respectively designated from left to right (as viewed in Fig. 1), as "Blank," "No. 1," "No. 2," "No. 3," "No. 4," "No. 5" and "No. 6." The outputs of the respective adjacent thermocouples are connected to a six-point recorder 20.

The desired order of testing the samples is from the deepest sample progressively up the well to the shallow sample, thereby obtaining trends and breaks which parallel the actual geological phenomena that originally caused the deposition or change of the successive strata.

In preferred practice, the differential thermal analysis samples are prepared in the following manner. Each sample, if likely to contain hydrocarbons, as is frequently the case in well logging samples, is leached with an organic solvent to remove the hydrocarbons. Each leached sample, or unleached sample, if leaching is not necessary, is then dried and crushed, preferably to minus 100 mesh to complete its preparation. Duplicate samples are prepared of the deepest sample and of every sixth sample.

The sample from the deepest strata and its duplicate are placed in the "Blank" and "No. 1" sample holders. The sample from the next deepest strata is placed in the "No. 2" sample holder, and etc. so that the samples are disposed in the sample holder in the order of decreasing depth.

The temperature of the block and samples is then gradually increased from room temperature to more than 1000° F., and the outputs of the adjacent thermocouples are recorded by the six-point recorder. A second set of six more samples may then be analyzed by replacing the first set with the second set, using the duplicate of the sixth deepest sample in the "Blank" sample holder for the second run. The foregoing procedure may be repeated to analyze as many samples as may be required.

Figure 2:
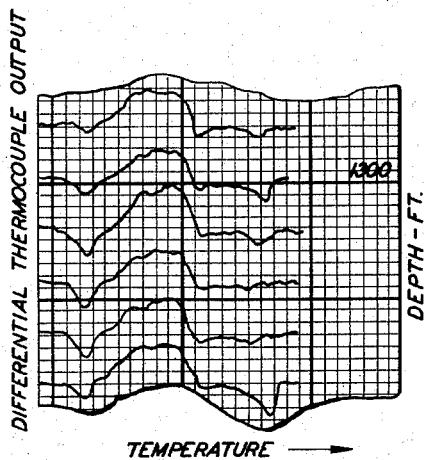
Fig. 2 is a series of six differential thermal analysis curves obtained with the previous method of differential thermal analysis as applied to six samples taken from six zones in a well.
Figure 3:
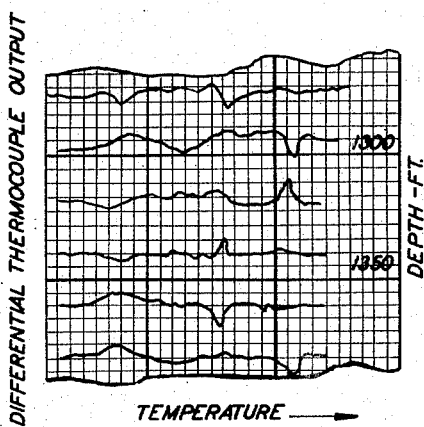
Fig. 3 is a series of six differential thermal analysis curves obtained using the method of this invention on six samples taken from the same zones as the samples which produced the curves of Fig. 2.

The importance of the present invention in expanding the usefulness of differential thermal analysis will be apparent from Figs. 2 and 3.

Referring to Fig. 2 of the drawing, six graphs or curves are shown representing in each case a thermal curve plotted against temperature. Each curve represents a sample taken from an exploratory well. In practice, temperature differentials are sensed in micro-volts of unbalanced signal developed at the two differentially arranged thermocouples. This unbalanced signal is amplified and recorded as the thermal curve, the abscissa of which represents micro-volts times the gain of the amplifier system. The temperature is plotted as the ordinate.

The curves of Fig. 2 were obtained using the technique of differential thermal analysis in use prior to this invention. A visual inspection of the curves indicates that they are substantially identical and would lead to the interpretation that the strata and the interval represented by the samples is uniform. However, the error of such an interpretation is made clear from reference to Fig. 3, which shows six curves obtained by the method of this invention and plotted in the same manner as for Fig. 2. The curves of Fig. 3 were produced by samples taken from the same depth intervals as were the samples for giving the curves of Fig. 2. If the formation had been truly uniform, as indicated by the curves of Fig. 2, the curves of Fig. 3 would have been horizontal and substantially straight. Instead, there are significant deviations of the curves of Fig. 3 from a straight horizontal line, which indicate that significant changes occurred in the strata represented by the six samples.

Thus, by practicing the method of differential thermal analysis in accordance with this invention, it is possible to locate important changes which otherwise would escape detection.

Such changes can often prove invaluable in establishing the correlation of cuttings and core samples between oil wells.

I claim:

1. An earth logging method comprising taking a first sample from the earth, taking a second sample from the earth adjacent the first, taking a third sample from the earth adjacent the second, simultaneously heating the first and second samples through a temperature rise sufficient to cause a thermal reaction in at least one of the first and second samples, recording thermal reactions taking place in the first and second samples, simultaneously heating the second and third samples through a temperature rise sufficient to cause a thermal reaction in at least one of the second and third samples, and recording thermal reactions taking place in the second and third samples whereby the deviation in thermal activity of one sample from an adjacent sample may be determined.

2. An earth logging method comprising drilling a well in the earth, taking an upper sample from the earth, taking a middle sample from the earth adjacent the upper, taking a lower sample from the earth adjacent the middle, simultaneously heating the lower and middle samples through a temperature rise sufficient to cause a thermal reaction in at least one of the lower and middle samples, recording thermal reactions taking place in the lower and middle samples, simultaneously heating the middle and upper samples through a temperature rise sufficient to cause a thermal reaction in at least one of the middle and upper samples, and recording thermal reactions taking place in the middle and upper samples whereby the deviation in thermal activity of one sample from an adjacent sample may be determined.

References Cited in the file of this patent

UNITED STATES PATENTS 2,705,417   Romo et al. _____ Apr. 5, 1955